(12) United States Patent
Sai et al.

(10) Patent No.: US 6,550,737 B1
(45) Date of Patent: Apr. 22, 2003

(54) COMPUTER MONITOR BEVERAGE HOLDER ASSEMBLY

(76) Inventors: Sanjay K. Sai, 2 Lake Dr., Algonquin, IL (US) 60102; Nazir T. AliMohammad, 929 Waterford La., Elk Grove Village, IL (US) 60007

( * ) Notice: Subject to any disclaimer, the term of this patent is extended or adjusted under 35 U.S.C. 154(b) by 0 days.

(21) Appl. No.: 10/059,520

(22) Filed: Jan. 30, 2002

(51) Int. Cl.[7] .................................................. A47K 1/08
(52) U.S. Cl. ............................. 248/311.2; 248/231.41; 248/918; 211/69.1
(58) Field of Search ............................. 248/311.2, 918, 248/217.4, 231.41, 229.22, 229.12, 103, 125.9, 125.3; 211/69.1

(56) References Cited

U.S. PATENT DOCUMENTS

| | | | | | |
|---|---|---|---|---|---|
| 648,928 A | * | 5/1900 | Davis | ........................ | 211/69.1 |
| 2,983,472 A | * | 5/1961 | Bowling | ................ | 248/231.41 |
| 3,315,932 A | * | 4/1967 | Chandler | ............... | 248/231.21 |
| 3,398,919 A | * | 8/1968 | Tokar | .......................... | 248/103 |
| 3,556,341 A | * | 1/1971 | Rains | ......................... | 206/818 |
| 5,039,044 A | * | 8/1991 | Sher | ............................ | 108/96 |
| 5,073,993 A | * | 12/1991 | Dewaal | ..................... | 4/227.1 |
| 5,074,512 A | * | 12/1991 | Gianforcaro et al. | .... | 248/279.1 |
| 5,533,697 A | * | 7/1996 | Fletcher et al. | ............. | 248/146 |
| 5,579,968 A | * | 12/1996 | Staschiak | ..................... | 224/274 |
| 5,738,320 A | * | 4/1998 | Matos et al. | .................... | 108/1 |
| 5,823,496 A | * | 10/1998 | Foley et al. | ................. | 248/156 |
| 5,842,671 A | * | 12/1998 | Gibbs | ....................... | 248/231.41 |
| D416,765 S | * | 11/1999 | Dankwardt et al. | .......... | D7/620 |
| 5,996,957 A | * | 12/1999 | Kurtz | ....................... | 248/231.21 |

* cited by examiner

*Primary Examiner*—Korie Chan
(74) *Attorney, Agent, or Firm*—Dillis V. Allen, Esq.

(57) ABSTRACT

A beverage holder assembly for the office area that includes a vertical clamp for attachment to a supporting object such as a computer monitor. A first vertical leg carries a first clamping jaw and a second vertical leg carries a second clamping jaw, with both jaws horizontally disposed. The jaws and the legs are locked in position by a screw-type transverse blade and a serrated strip lock. The beverage holder is cylindrical and has a sleeve slidable on the legs to provide holder height adjustment.

8 Claims, 5 Drawing Sheets

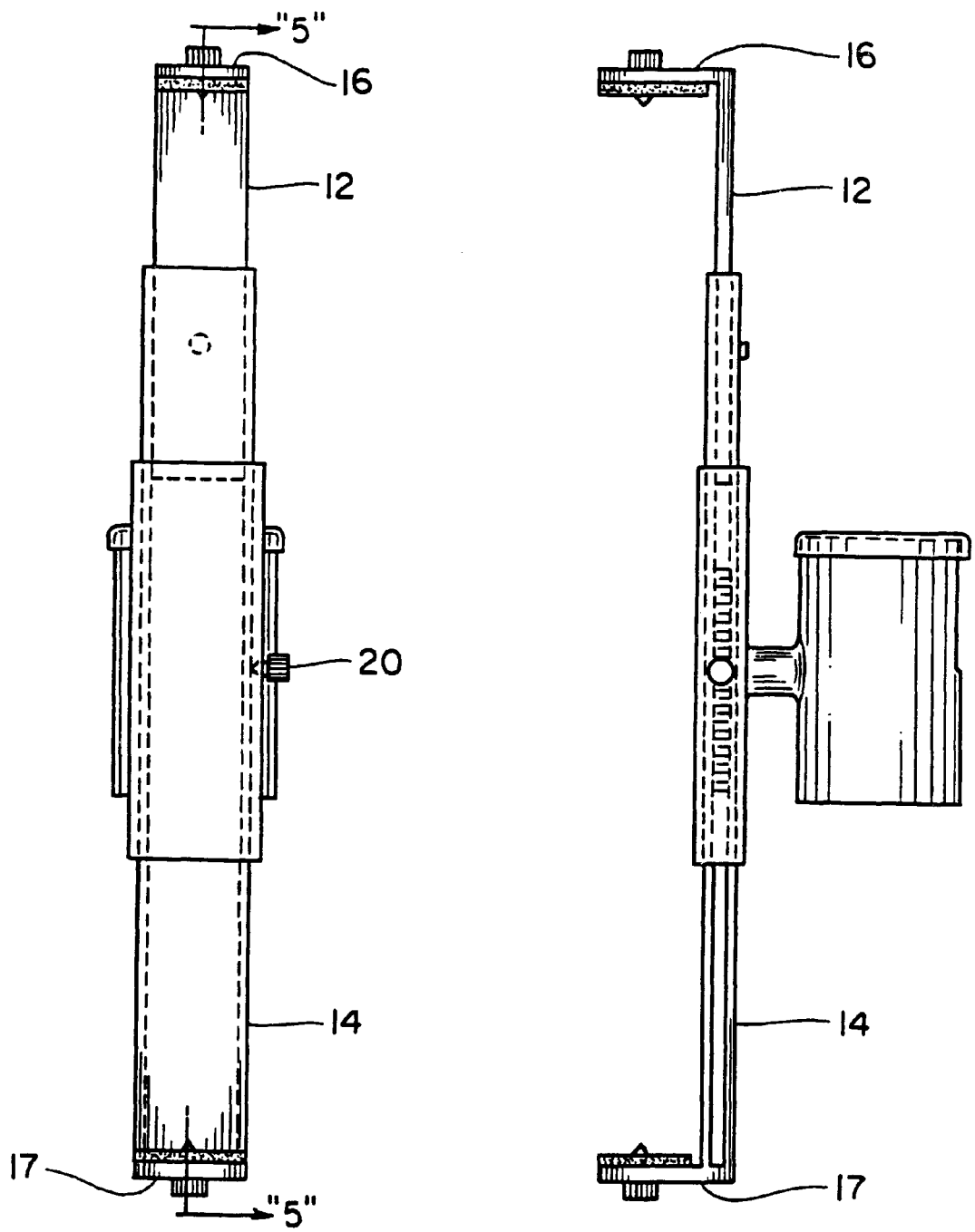

COMPUTER MONITOR BEVERAGE HOLDER ASSEMBLY

BACKGROUND OF THE INVENTION

Computer operators frequently consume beverages while on the computer and usually place or rest them on the horizontal supporting surface for either the computer monitor or the computer keyboard, which is frequently movable relative to the computer monitor supporting surface as is well known in the art.

Unfortunately, while the computer operator is absorbed with eyes trained either on the monitor or on the keyboard, the beverage container frequently gets knocked over by the wandering hand of the operator frequently causing damage to the desktop or is consumed by the keyboard, damaging the keyboard.

The following patents are illustrative of clamping style supports for a variety of articles:

| Inventor | U.S. Pat. No. | Issue Date |
| --- | --- | --- |
| Hewitt | 2,880,024 | 3-31-59 |
| Sprouse, et al. | 2,978,216 | 4-4-61 |
| Condon | 3,148,851 | 9-15-64 |
| Groff | 3,260,486 | 7-12-66 |
| Melton, III | 4,328,915 | 5-11-82 |

The Melton, U.S. Pat. No. 4,328,915, shows a wire basket clamping assembly having an axially adjustable rod 18 that is clamped by a member 28 threaded fastener.

The Groff, U.S. Pat. No. 3,260,486 shows a holder for an automobile identification marker clamped around a stationary board 13 with a fastener 10.

The Condon, U.S. Pat. No. 3,148,851 shows an umbrella attachment to a golf cart with angularly adjustable elements 76 and 62 clamped together by threaded member 74.

The Sprouse, et al., U.S. Pat. No. 2,978,216, shows a fan support bracket that is axially adjustable on vertical member 17 clamped by threaded member 30.

It is a primary object of the present invention to ameliorate the problems of the prior art.

SUMMARY OF THE PRESENT INVENTION

In accordance with the present invention, a unique beverage holder assembly is provided for the office area that includes a vertical clamp for attachment to a supporting office object, such as a computer monitor. A first vertical leg carries a first horizontal clamping jaw and a second vertical leg carries a second horizontal clamping jaw. The jaws and the legs are locked in position by a screw-type transverse blade and a serration strip on one of the legs. The beverage holder is cylindrical and has a sleeve slidable on the legs to provide height adjustment with a similar screw-type transverse blade and serration lock.

In one embodiment, the beverage holder is rotationally locked to the legs, and in another embodiment, the beverage holder may be swiveled.

The beverage holder has a cover for the cylindrical portion thereof and the cover has a plurality of apertures therein to receive miscellaneous office articles.

Other objects and advantages of the present invention will appear more clearly from the following detailed description.

BRIEF DESCRIPTION OF THE DRAWINGS

FIG. 3 is a left side view of the beverage holder illustrated in FIG. 1;

FIG. 4 is a front view similar to FIG. 1 but somewhat enlarged;

DETAILED DESCRIPTION OF THE PREFERRED EMBODIMENT

Figure 1:
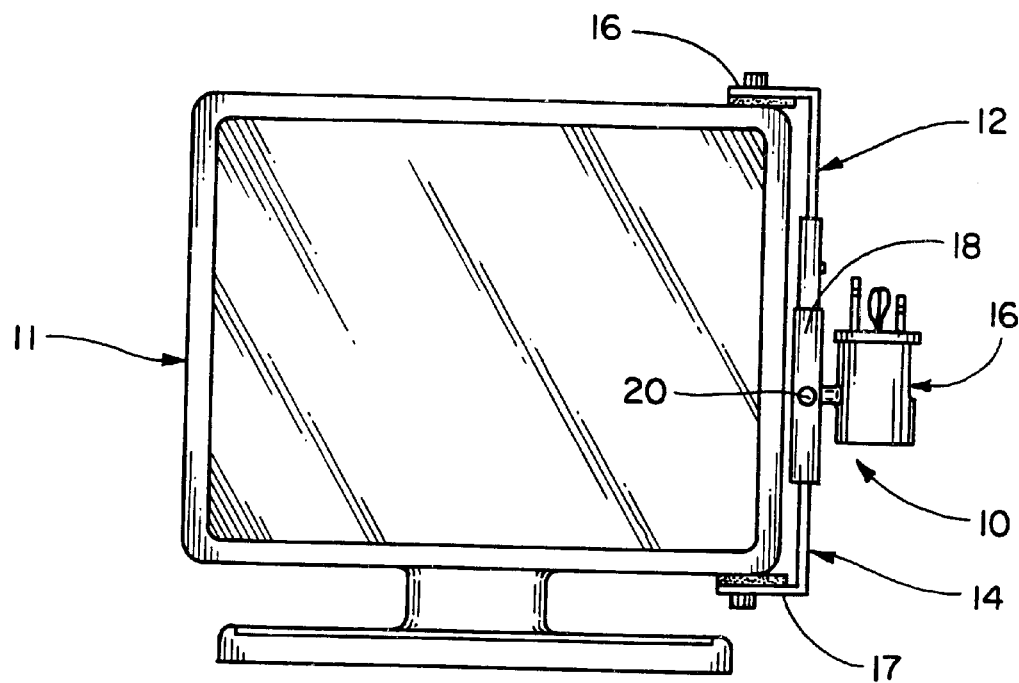
FIG. 1 is a front view of a computer monitor with the present beverage holder assembly mounted to the right side of the monitor.

Referring to the drawings, a beverage holder assembly 10 is illustrated according to the present invention and is seen in FIG. 1, to be connected and supported on the right side of a computer monitor 11, and it should be understood that it could also be connected to the left side for left-handed beverage consumers. The assembly 10 is seen to generally include an upper leg member 12 telescopically received in a lower leg member 14, and both the upper and lower legs have horizontally depending jaws 16 and 17 respectively that clamp on the upper and lower walls of the computer monitor 11. A cup holder sub-assembly 16 has an integral sleeve 18 slidable on the lower leg member 14 and adjustably fixed thereto (a height adjustment) by a locking mechanism 20.

It should be understood that the upper and lower leg members 12 and 14, and the cup holder sub-assembly 16 are preferably constructed of injection molded plastic for economy, durability and strength.

Figure 7:
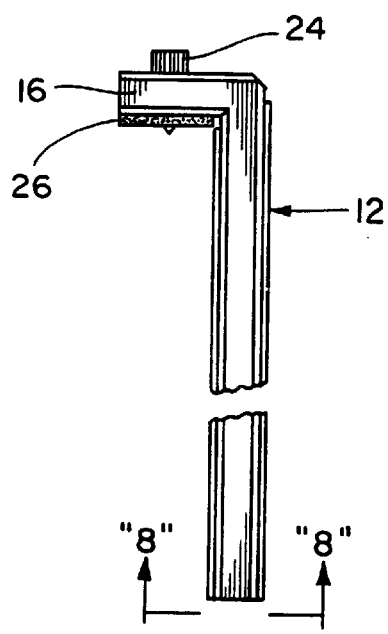
FIG. 7 is a sub-assembly of the upper leg member.
Figure 8:
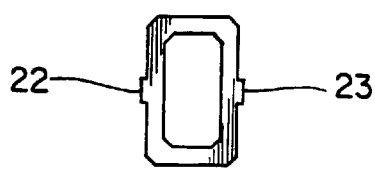
FIG. 8 is a bottom view of the upper leg member shown in FIG. 7 taken generally along line 8—8 of FIG. 7.
Figure 5:
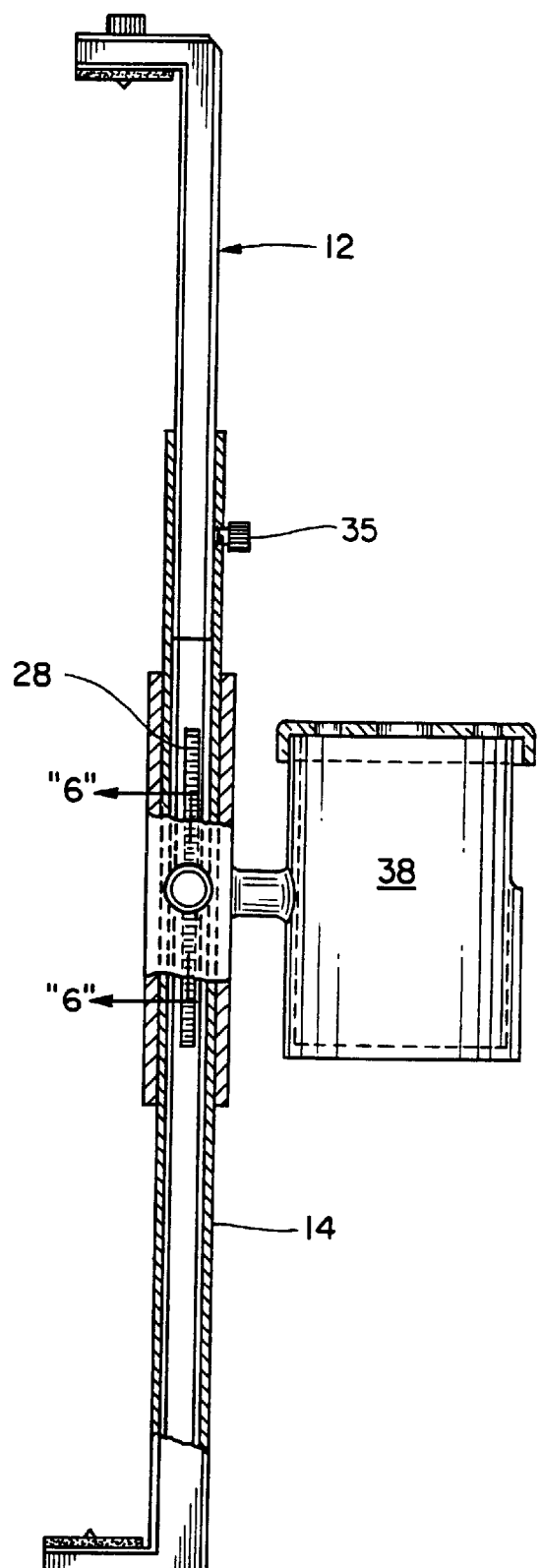
FIG. 5 is a enlarged front view in partial longitudinal section.

As seen in FIG. 7, the upper leg member is tubular and has a generally rectangular cross section ribbed on its sides at 22 and 23 to provide a locking engagement in the lower leg member 14. The jaw 16 has a screw-type lock 24 and dual hook and loop flexible adhesive connectors 26 to lock the assembly to the top of the computer monitor.

Figure 14:
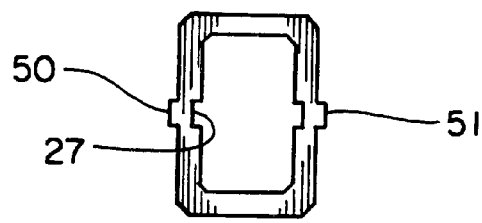
FIG. 14 is a top view of the lower leg assembly taken generally along line 14—14 of FIG. 13.
Figure 15:
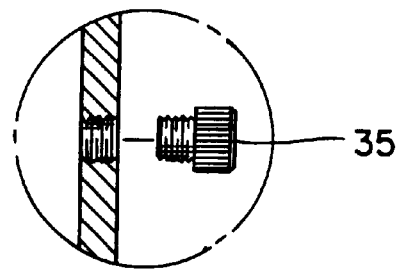
FIG. 15 is an enlarged fragmentary view taken in the circle of FIG. 13 showing the leg member lock.
Figure 13:
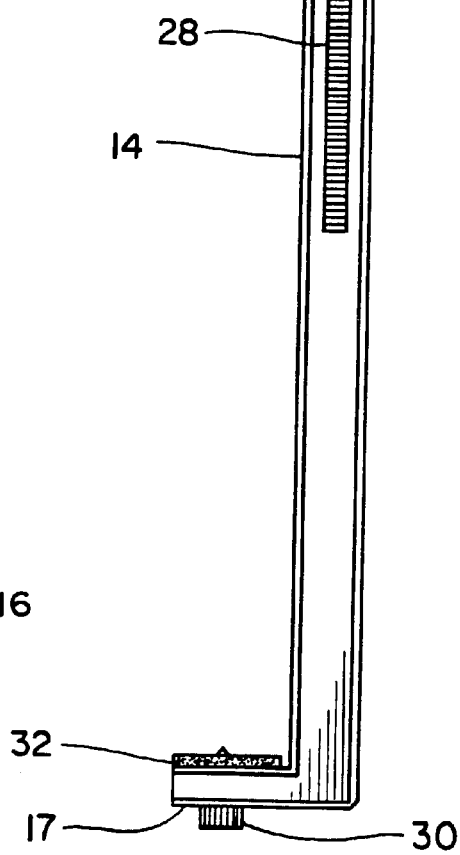
FIG. 13 is a sub-assembly of the lower leg in longitudinal section.

The lower leg assembly 14 as seen in FIG. 13, is also tubular in construction and generally rectangular in cross section as seen in FIG. 14, and it has slots 27 to receive the ribs 22 and 23 on the upper leg 12. The exterior, as well as the interior of one side of the lower leg member 14 has a plurality of horizontal serrations 28 that form part of the locking mechanism seen in FIG. 1 that locks the cup holder sub-assembly 16 to the lower leg 14.

The jaw 17 of the lower leg 14 has a screw-type pointed fastener 30 and a pair of hook and eye adhesive layers 32 for attachment to the lower surface of the computer monitor as seen in FIG. 1.

After the upper leg 12 is telescoped into the lower leg member 14, and the jaws 16 and 17 engage the computer monitor, a screw-type lock 35 carried by an upper portion of the lower leg 14, locks the upper leg relative to the lower leg.

Figure 9:
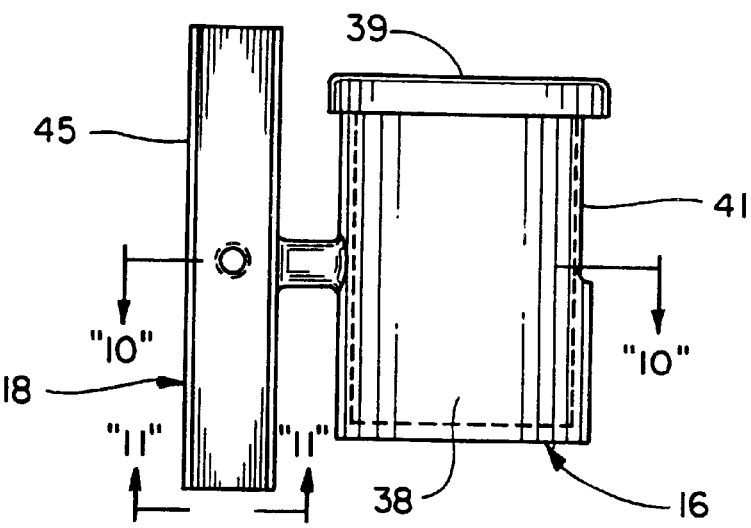
FIG. 9 is a front view of the cup holder sub-assembly.
Figures 10, 11:
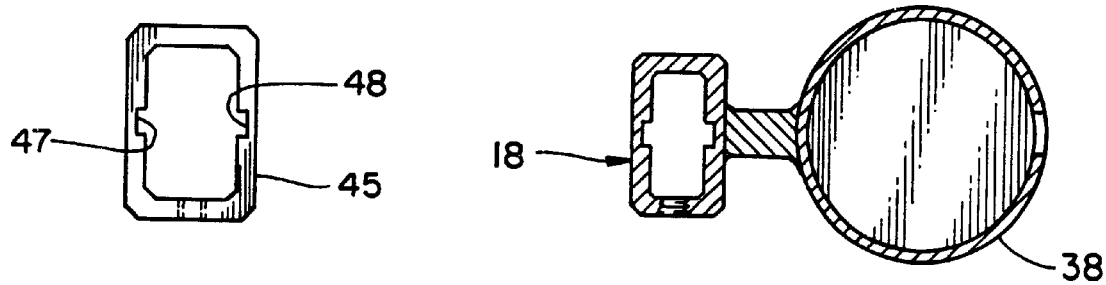
FIG. 10 is a cross-section of the cup holder sub-assembly taken generally along line 10—10 of FIG. 9.
FIG. 11 is a bottom view of the cup holder sub-assembly sleeve taken generally along line 11—11 of FIG. 9.
Figure 12:
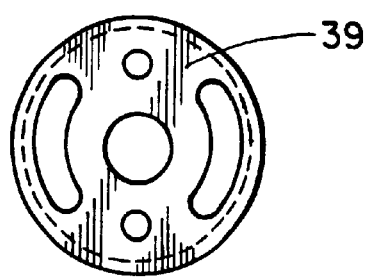
FIG. 12 is a top view of the cup holder cover.

As seen in FIGS. 9, 10, and 11, the beverage holder 16 includes a cylindrical beverage container portion 38 with a removable cover 39. Container 38 is slotted at 41 to receive the handle of the cup, and the cup portion has a horizontally projecting post 43 that is formed integrally with sleeve portion 45. As seen in FIG. 11, the sleeve portion 45 is generally rectangular in a cross section, and it has opposed recesses 47 and 48 that slidably receive the outer ribs 50 and 51 of the lower leg 14, as seen in FIG. 14.

Figure 6:
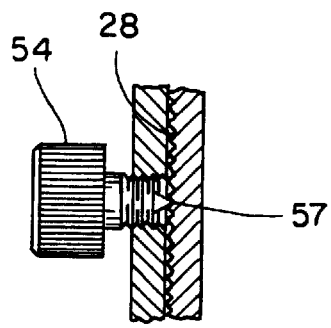
FIG. 6 is a fragmentary view of the cup holder lock taken generally along line 6—6 of FIG. 5.

The sleeve 18 is vertically adjustable on the lower leg 14 and is locked in position thereon by the locking mechanism 20, which includes the serrations 28 on the outside of the leg member 14 and a rotatable screw 54 shown clearly in FIG. 6. Screw 54 has a pointed end 57 that engages in any of the grooves forming the serrations 28, which are generally horizontally disposed.

It should be understood that the screw-type lock 35 that locks the upper leg to the lower leg may also take the form of the serrations 28 and the pointed screw 54.

Figure 2:
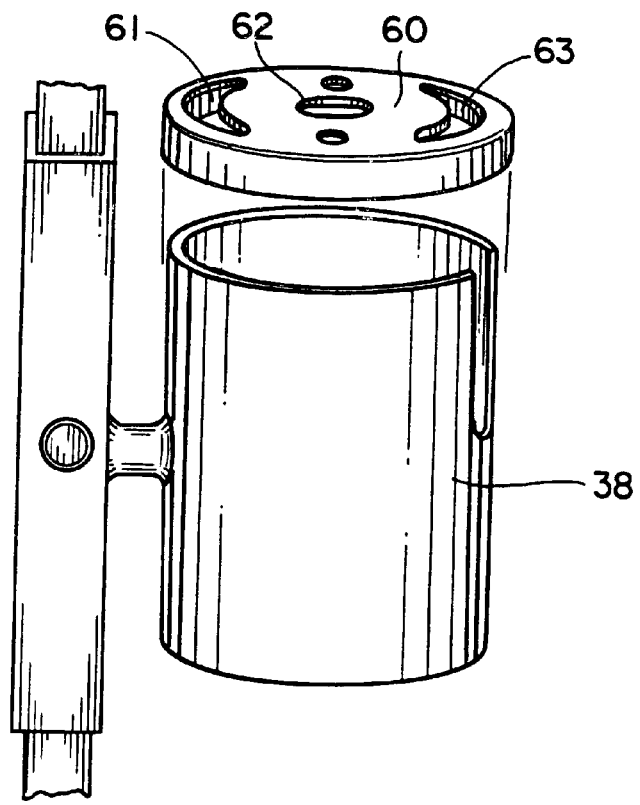
FIG. 2 is a fragmentary exploded view of the beverage holder illustrated in FIG. 1.

As seen in FIG. 2, the cover 39 has a plurality of apertures 61, 62, 63, etc. therein for receiving pencils, rulers, and other objects when the cylindrical cup holder 38 is not in use.

Figure 16:
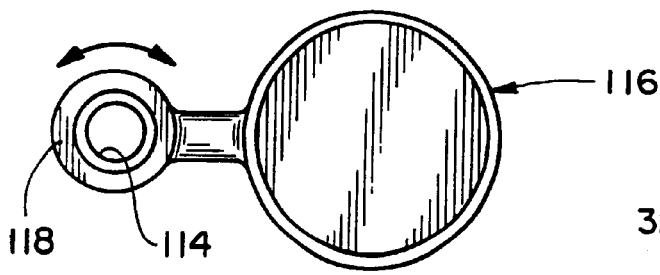
FIG. 16 is a fragmentary top view of another embodiment in which the cup holder swivels about a generally vertical axis.

In FIGS. 1 to 15, the cup holder portion 38 is rotationally fixed, and in FIG. 16, a second embodiment of the present invention, a different cup holder sub-assembly 116 is illustrated having an annular sleeve 118 that is pivotally adjustable about a vertical axis on a cylindrically tube-shaped lower leg member 114. This enables swivel adjustment of the cup holder.

What is claimed is:

1. A beverage holder assembly for the computer-office area, comprising: a first leg having a first angularly related jaw member, a second leg generally parallel to the first leg and axially adjustable with respect thereto, a lock to fix the first leg with respect to the second leg, said second leg having a second angularly related jaw member so the jaw members move toward and away from one another to engage and clamp on a supporting surface, and a beverage holder carried by one of the first and second leg members between the first and second jaw members, said jaw members being spaced sufficiently so they may engage and clamp on a PC type monitor, said beverage holder including a sleeve mounted on one of the first and second legs that is vertically adjustable thereon, and an external screw type locking device for vertically locking the sleeve to said one leg, said lock including a transverse screw for locking the first leg to the second leg.

2. A beverage holder assembly for the computer-office area as defined in claim 1, wherein the beverage holder has a vertical slot for receiving the handle of a cup.

3. A beverage holder assembly for the computer-office area as defined in claim 1, wherein the jaw members have flexible hook and loop connectors thereon and threaded pointed members.

4. A beverage holder assembly for the computer-office area as defined in claim 1, wherein the beverage holder pivots about a generally vertical axis.

5. A beverage holder assembly adapted to be releasably clamped to a computer monitor, comprising: a first generally vertical leg member having a first generally horizontal jaw projecting therefrom, a second generally vertical leg member slidably adjustable relative to the first leg member and having a second generally horizontal jaw projecting therefrom, a lock for clamping the leg members together after the jaw members clamp against the computer monitor, and a beverage holder mounted on one of the first and second leg members between the first and second jaw members, said jaw members being spaced sufficiently so they may engage and clamp on a PC type monitor, said beverage holder including a sleeve mounted on one of the first and second legs that is vertically adjustable thereon, and an external screw type locking device for vertically locking the sleeve to said one leg, said lock including a transverse screw for locking the first leg to the second leg.

6. A beverage holder assembly as defined in claim 5, including a cover on the beverage holder having a plurality of apertures therein for receiving miscellaneous office items for converting the holder from a container holder to an office item holder.

7. A beverage holder assembly as defined in claim 5, wherein the jaw members have flexible loop and hook connectors and screw type pointed members.

8. A beverage holder assembly as defined in claim 5, wherein the beverage holder has a vertical slot for receiving the handle of a cup.

\* \* \* \* \*